United States Patent
Huang

(10) Patent No.: US 11,320,813 B2
(45) Date of Patent: May 3, 2022

(54) INDUSTRIAL ASSET TEMPORAL ANOMALY DETECTION WITH FAULT VARIABLE RANKING

(71) Applicant: General Electric Company, Schenectady, NY (US)

(72) Inventor: Hao Huang, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 807 days.

(21) Appl. No.: 16/170,699

(22) Filed: Oct. 25, 2018

(65) Prior Publication Data

US 2020/0133253 A1    Apr. 30, 2020

(51) Int. Cl.
G05B 23/02    (2006.01)

(52) U.S. Cl.
CPC ..... *G05B 23/0272* (2013.01); *G05B 23/0221* (2013.01); *G05B 23/0254* (2013.01)

(58) Field of Classification Search
None
See application file for complete search history.

(56) References Cited

U.S. PATENT DOCUMENTS

| 8,914,317 B2 | 12/2014 | Biem |
| 2006/0101402 A1 | 5/2006 | Miller |
| 2010/0305806 A1 | 12/2010 | Hawley |
| 2012/0041575 A1 | 2/2012 | Maeda et al. |
| 2012/0316835 A1 | 12/2012 | Maeda et al. |
| 2013/0073260 A1 | 3/2013 | Maeda et al. |
| 2014/0195184 A1 | 7/2014 | Maeda et al. |

FOREIGN PATENT DOCUMENTS

CN    107403480 A    11/2017

OTHER PUBLICATIONS

Morrow, Adam et a., "Ranking Anomalous High Performance Computing Sensor Data Using Unsupervised Clustering", 2016 IEEE. (Year: 2016).*
Ding, Yi et al., "Large Scale Kernel Methods for Online AUC Maximization", 2017 IEEE (Year: 2017).*

(Continued)

*Primary Examiner* — Carlos R Ortiz Rodriguez
(74) *Attorney, Agent, or Firm* — Buckley, Maschoff & Talwalkar LLC

(57) ABSTRACT

A method of temporal anomaly detection includes accessing sensor data readings obtained at a monitored industrial asset, performing a data cleanup operation on at least a portion of the accessed sensor data readings, transforming at least the cleaned-up portion of the accessed sensor data readings to time series feature space sensor data, applying a multi-kernel-based projection algorithm to the time series feature space sensor data, computing a respective anomaly score and a respective ranking for one or more variables of the sensor data readings, and providing at least the computed respective anomaly score or the respective ranking for at least one of the one or more variables to a user. Ranking the anomaly score includes comparing each anomaly score to a threshold and then assigning a ranking to scores with a magnitude greater than the threshold based on its magnitude. A system and a non-transitory computer-readable medium are also disclosed.

15 Claims, 4 Drawing Sheets

(56) References Cited

OTHER PUBLICATIONS

Trinh, Van et al., "Data Driven Hyperpararmeter Optimization of One-Class Support Vector Machines for Anomaly Detection in Wireless Sensor Networks", 2017 IEEE (Year: 2017).*

Chen, Guangliang et al., "A Fast Multiscale Framework for Data in High-Dimensions: Measure Estimation, Anomaly Detection, and Compressive Measurements", 2012 Visual Communications and Image Processing, USA, 2012, (pp. 1-6, 6 total pages).

Theissler, Andreas "Detecting known and unknown faults in automotive systems using ensemble-based anomaly detection", Knowledge-Based Systems, vol. 123, Germany, 2017, DOI: 10.1016/j.knosys.2017.02.023, (pp. 163-173, 11 total pages).

* cited by examiner

INDUSTRIAL ASSET TEMPORAL ANOMALY DETECTION WITH FAULT VARIABLE RANKING

BACKGROUND

Effective data-driven analytics is possible using advancements in sensor technologies and networked industrial machinery design. Industrial assets often have multiple sensors monitoring operation. With connection to the Internet of Things (IoT), access to the sensor data can be obtained in data streams at almost real time. This increasing availability of streaming time series data can have a practical purpose in detecting anomalies in the operation of the industrial asset.

An industrial asset can be, among other things and without limitation, a generator, gas turbine, power plant, manufacturing equipment on a production line, aircraft engine, wind turbine generator, locomotive, imaging device (e.g., X-ray, MRI, CT, PET, SPECT systems), or mining operation drilling equipment. Each instance of a time series data set is recorded at a certain timestamp of an asset. An event is a failure case that happens at a certain timestamp within the time series data.

An anomaly in the time series data can indicate a change in the industrial asset's status (e.g., a change in turbine rotation). Identification of the anomaly can be beneficial in predicting faults and/or updating maintenance schedules.

DESCRIPTION

Figure 1:
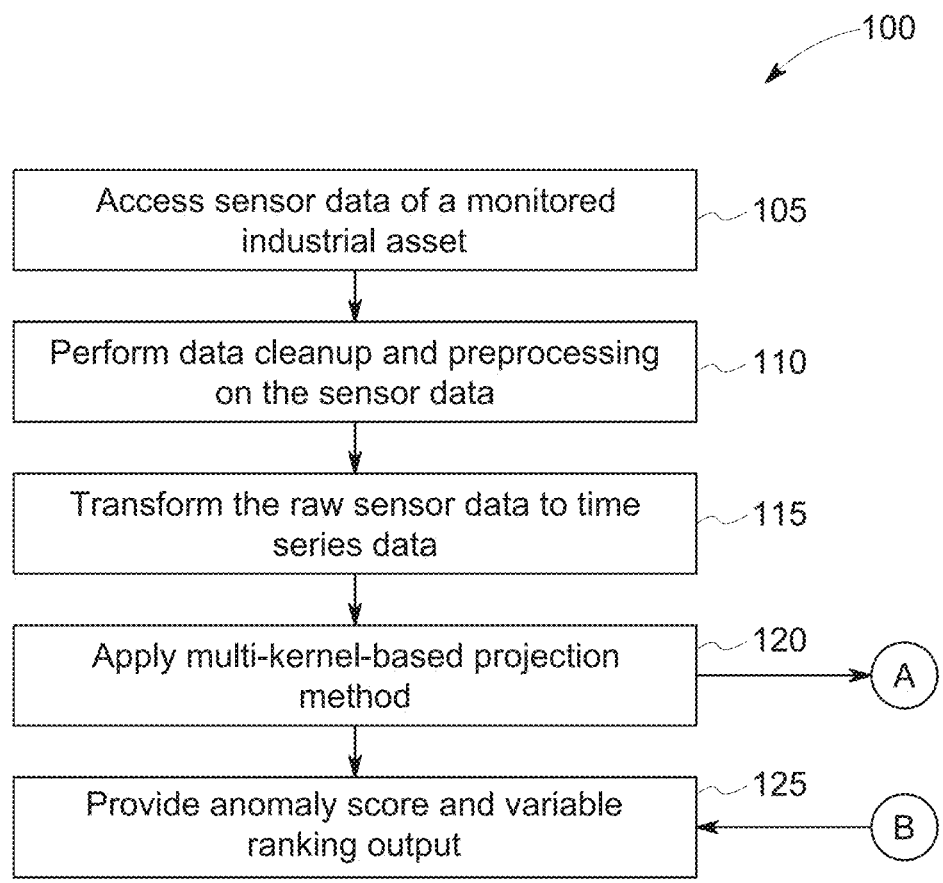
FIG. 1 illustrates a process that implements a temporal anomaly detection algorithm in accordance with embodiments.

Embodying systems and methods provide detection of temporal anomaly(ies) in multivariate time series data. An embodying temporal anomaly detection (TAD) algorithm can be an unsupervised, high-dimensional detector that incorporates manifold learning and provides kernel construction options. An embodying TAD algorithm can provide an anomaly score for each input sample, and also a corresponding feature/variable ranking.

A temporal anomaly can be difficult to detect, but the temporal anomaly can serve as an early warning that there could be an underlying problem with the industrial asset. An embodying TAD algorithm can provide an anomaly score for each input sample (stream of sensor data). The anomaly score is indicative of the likelihood of the corresponding sample being the anomaly—for example, a higher anomaly score makes it more likely of a sample being the anomaly source. It should be readily understood that the invention is not so limited, and that other scales can be applied to the anomaly score.

In accordance with embodiments, along with an anomaly score, an embodying TAD algorithm can support further decision-making by performing root cause analysis. Also, the TAD algorithm can provide a corresponding feature/variable ranking, which can rank the most contributing feature(s) to the detected anomaly(ies).

An embodying TAD algorithm can have one or more of the following characteristics:

(1) Unsupervised: Anomaly detection can be unsupervised (i.e., no anomaly label is required). In this implementation, the algorithm can detect those anomalies that are not well-understood or quantified. The algorithm's training set is assumed to be normal. The training set need not be purely normal, as long as the abnormality in the training data represents a small portion. Any samples with strongly deviated pattern in a testing set would be assigned a high anomaly score.

(2) High-dimensional: In this implementation there is an assumption that on the occurrence of an anomaly (e.g., component failure), an anomalous pattern appears in the time series data for multiple variables simultaneously. This approach can be effective when there are a lot of possibly-related variables to the anomalies. The algorithm can effectively detect anomalous patterns from a large number of input tags (raw variables or derived variables), where input data dimensions can be voluminous (e.g., hundreds or perhaps thousands).

(3) Multi-kernels: The algorithm can operate with the selection of differing options of kernel construction. The algorithm can include more than one kernel to measure the degree of anomaly, which can not only built upon Euclidean space (e.g. Gaussian kernel), but also other linear and non-linear kernel space.

Options of kernel construction can include, but are not limited to, "braycurtis", "Canberra", "Chebyshev", "cityblock", "correlation", "cosine", "dice", "euclidean", "hamming", "jaccard", "kulsinski", "mahalanobis", "matching", "minkowski", "rogerstanimoto", "russellrao", "euclidean", "sokalmichener", "sokalsneath", "sqeuclidean", "yule". The kernel selection can depend on differentiability of the data in that kernel space. The distribution of training dataset (which can be normal or near normal) should be differentiable in the selected kernel space.

FIG. 1 illustrates a process that implements temporal anomaly detection algorithm 100 in accordance with embodiments. Sensor data is accessed, step 105. The sensor data can be raw (i.e., sensor reading data), multivariate, temporal sensor data from a monitored industrial asset. Data cleanup and preprocessing can be performed, step 110, which can include filling missing values. The cleanup can include removal of outlier data points (e.g., perhaps a measurement error from the sensor). Data can be filled by interpolation and/or imputation techniques.

The raw sensor reading data variables can be transformed, step 115, to time series features (transformed variables) using temporal feature engineering techniques. In some implementations, feature transformation is calculated with a sliding-window with a certain length l. Although not limiting, two types of feature transformations can be: univariate and pair-wise. The input is vector b related to one/two raw features, with length(b)=l. The output is one scalar which describes the statistics of b in a certain way.

Given a time-series vector $b \in R^{l \times 1}$, the following univariate feature transformation options can include: Movingaverage: mean(b); Standard deviation: std(b); Level-shift: lsf(b)=max(b)−min(b); Autocorrelation: autocorr(b); Standard deviation of delta: sdn(b)=std(diff(b)); Vibration degree: vbr(b)=std(b)×sdn(b); and Spike:

$$spk(b) = b_{l/2} - \text{mean}\left(b_{1:\frac{l}{3}}, b_{\frac{2l}{3}:l}\right).$$

For the a two dimensional time-series vector $b \in R^{l \times 2}$, the following pair-wise feature transformation options can include: Covariance: cov(b)=covariance($b_{:,1}$, $b_{:,2}$); and Correlation: crl(b)=correlation($k_{:,1}$, $b_{:,2}$). The transformed data set can be projected, step 120, onto a low embedding space using multi-kernel-based projection method(s).

Figure 2:
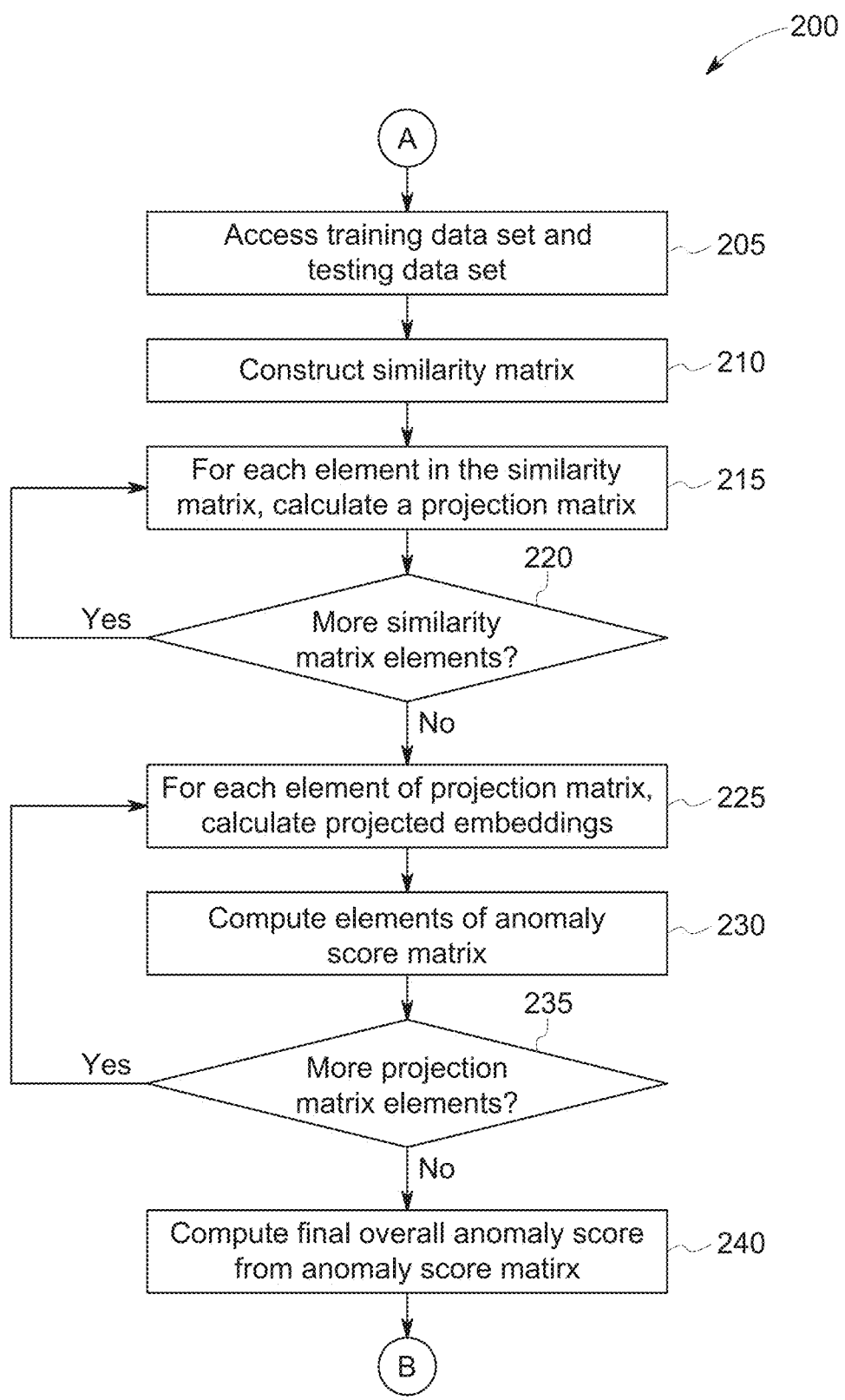
FIG. 2 illustrates a process that implements a multi-kernel-based projection method within the temporal anomaly detection algorithm of FIG. 1 in accordance with embodiments.

FIG. 2 illustrates a process that implements multi-kernel-based projection (MKP) algorithm 200 in accordance with embodiments. In some embodiments, this method can be implemented as a manifold learning modeling algorithm. A training data set and a testing data set are accessed, step 205, as input for the MKP algorithm. The training set can be historical data before a selected time and the testing set can be data after that selected time. The training and the testing sets are derived from sensor data after undergoing the data cleanup and preprocessing process (e.g. data cleaning, feature engineering and data normalization).

The training data set can be expresses as $X_{trn} \in R^{n1 \times m}$ and the testing data set as $X_{tst} \in R^{n2 \times m}$, where n1 (n2) is the number of training (or testing) samples, and m is the number of transformed features. The number of low embedding kernels is represented by k. MKP algorithm 200 can provide an anomaly score output $s \in R^{n2 \times 1}$ for the testing data set.

A similarity matrix ($A_{1:t}$=[$A_1$, $A_2$, . . . , $A_t$] for $X_{trn}$) is constructed, step 210; where t is the number of the chosen kernel options and $A_i \in R^{n1 \times n1}$ is the similarity matrix based on each kernel (1≤i≤t). For each element of the similarity matrix ($A_i$ in $A_{1:t}$), a projection matrix is calculated, step 215.

Calculation of the projection matrix includes first, calculating $$L_i = D_i - A_i \quad \text{(EQ. 1)}$$

where $D_i$ is the degree matrix of $A_i$; then, calculating top k eigenvectors $\Psi_i \in R^{n1 \times k}$ with the smallest eigenvalues $$\lambda_i \in R^{1 \times k} \text{ of } L_i \quad \text{(EQ. 2)}$$

The projection matrix can then be calculated as $$P_i \in R^{m \times k} \quad \text{(EQ. 3)}$$

from $L_i$ to $\psi_i$ using elastic net regression.

After a projection matrix is calculated for each element of the similarity matrix, step 220, the MKP algorithm proceeds. The MKP algorithm follows steps 225-235 to calculate projected embeddings and an anomaly score matrix.

At step 225, for each element in the projection matrix ($P_i$), projected embeddings are calculated by applying each $P_i$ to $X_{tst}$ to get the projected embeddings $$\phi_i \in R^{n2 \times k} \quad \text{(EQ. 4)}$$

Corresponding elements of an anomaly score matrix are calculated, step 230, and can be expressed as $$S_{i,j} = \Sigma_p e^{-\lambda_i p} \phi_i(j,p) \quad \text{(EQ. 5)}$$

where j is the index of testing sample, p is the index of eigenvector/eigenvalue.

The projected embeddings and corresponding anomaly score matrix elements are calculated for all elements of the projection matrix, step 235. Once all elements are calculated, a final anomaly score vector (s by $s_j = \Sigma_i S_{i,j}$; where j is the index of each testing sample) is computed, step 240. The anomaly score is calculated by measuring the neighborhood density of each sample in the low embedding space. The results of MKP algorithm 200 are returned to TAD algorithm 100.

With reference again to FIG. 1, the anomaly score and variable ranking output is provided to a user, step 125. This output can include identification of a transient fault in the industrial asset; identification of the temporal event that caused the transient fault; and/or the fault propagation through the time series data. The identification of the transient fault can be determined based on a user's predefined threshold. The user can determine the threshold level from parameters such as, but not limited to, the nature (i.e., type) of the industrial asset and a case-specific amount of variation or dispersion in the sensor data values that is acceptable to the user. The fault ranking can be quantified by the magnitude of each identified fault's individual variance from the user's predefined threshold.

Figure 3:
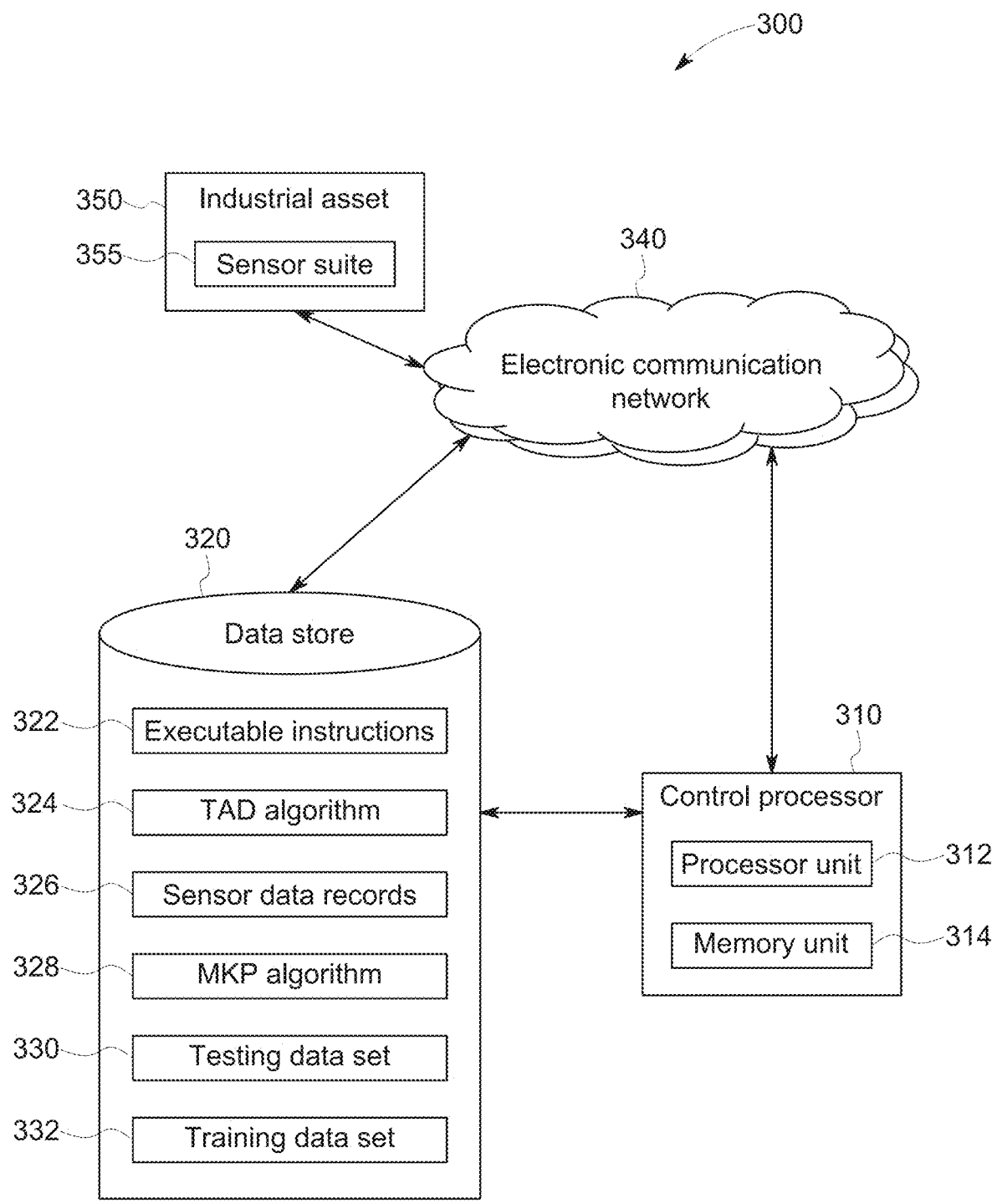
FIG. 3 depicts a system for implementing the temporal anomaly detection algorithm of FIG. 1 in accordance with embodiments.

FIG. 3 depicts system 300 for implementing temporal anomaly detection algorithm 100 in accordance with embodiments. Control processor 310 can include processor unit 312 and memory unit 314. The control processor can be in direct communication with data store 320, or in indirect communication across electronic communication network 340. Processor unit 312 can execute executable instructions 322, which cause the processor to perform TAD algorithm 100 and MKP algorithm 200 in accordance with embodiments. Memory unit 314 can provide the control processor with local cache memory.

The data store can include sensor data records 326 that contain operational data monitored by sensor suite 355 in industrial asset 350. Only one industrial asset is depicted, however, there can be multiple industrial assets each including sensor suites that provide monitored data across electronic communication network 340 to data store 320. The data store can also include TAD algorithm 324, MKP algorithm 330, training data set 330, and testing data set 332.

Figure 4:
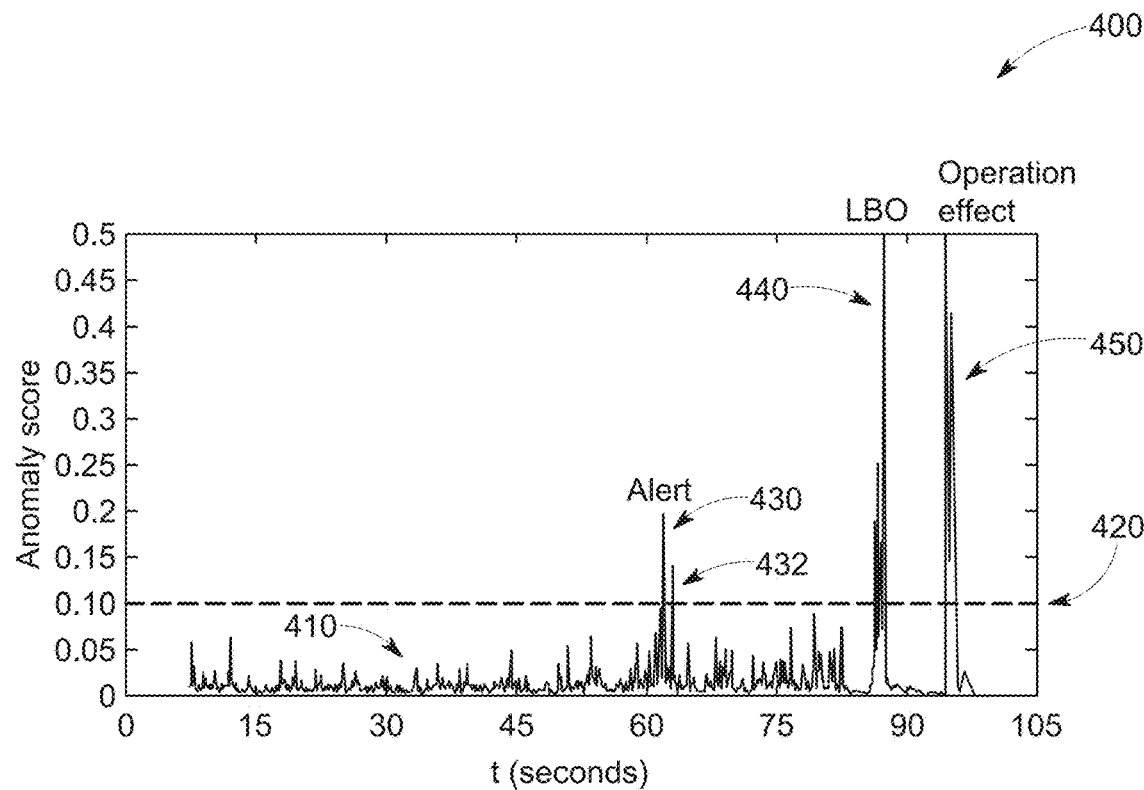
FIG. 4 illustrates an exemplary graphical output of the temporal anomaly detection algorithm of FIG. 1 in accordance with embodiments.

In some embodiments, the anomaly score and variable ranking outputs of TAD algorithm 100 (step 125) can be presented graphically. FIG. 4 illustrates an exemplary graphical output 400 of the temporal anomaly detection algorithm in accordance with embodiments.

TAD output curve 410 represents monitored sensor data over a time period from a single sensor. This output curve depicts the data in time series feature space after processing by TAD algorithm 100. Failure spike 440 represents a failure in an industrial asset (e.g., a lean blowout (LBO) in a turbine generator). Operator effect spike 450 indicates failure propagation.

Alert spike 430, 432 each represent a failure event in the industrial asset. These spikes occur at different times, and each exceeds user predefined threshold 420. Analysis of TAD output curve 420 shows that before the LBO occurrence, the TAD algorithm successfully detected a problem(s) prior to the occurrence of the failure event. This early detection can provide a possibility for any early response to prevent failure events and their subsequent failure propagation.

Figure 5:
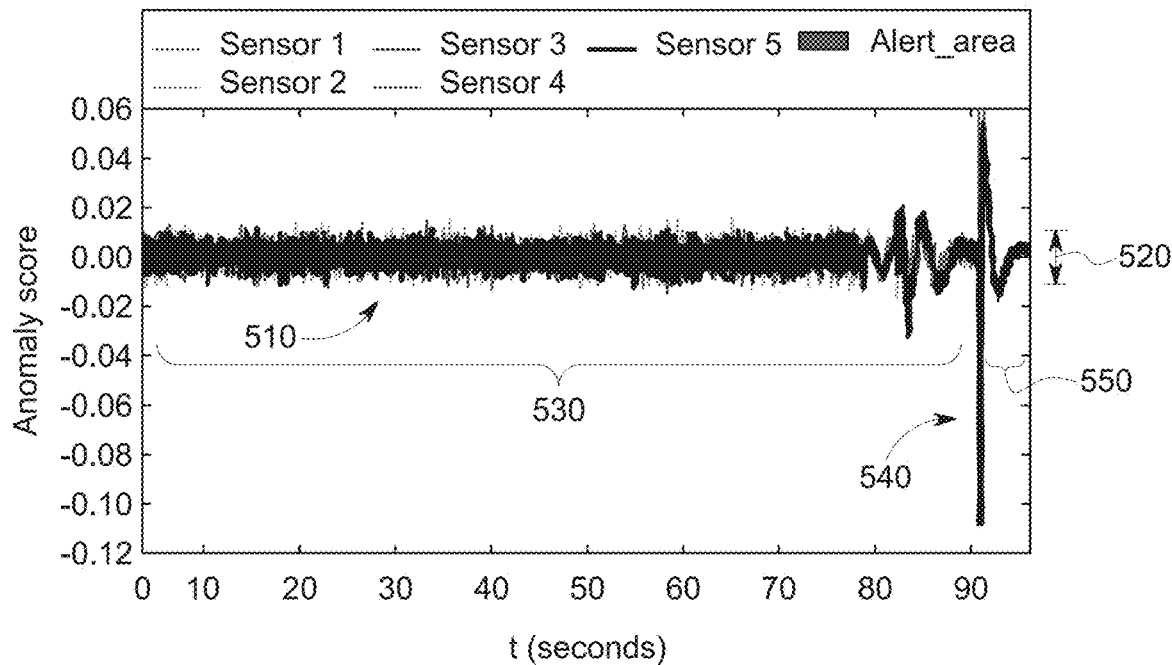
FIG. 5 illustrates a second exemplary graphical output of the temporal anomaly detection algorithm of FIG. 1 in accordance with embodiments.

FIG. 5 illustrates a second exemplary graphical output 500 of the temporal anomaly detection algorithm of FIG. 1 in accordance with embodiments. Graphical curve 500 provides a view on key contributing features to the detected alert spike 430, 432. This view of can be used to support decisions regarding repair and/or maintenance scheduling for the industrial asset. TAD output curve 510 is a superimposition of input space sensor data from multiple sensors. Depicted in this illustration is raw data from five sensors. The invention is not so limited and other numbers of sensor data can be superimposed. Time period 530 represents a period when the industrial asset is operating in normal range 520. Perturbation spike 540 indicates the occurrence of a problem. After the problem occurs, the industrial asset returns to normal operating range 520 during time period 550. Analysis of TAD output curve 510 informs that a problem occurred but operations returned to normal, which can lead to a conclusion that the industrial asset requires maintenance. More particularly, the component(s) being monitored by sensor(s) that contribute to perturbation spike 540 should be evaluated, maintained, repaired, and/or replaced.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method of temporal anomaly detection and fault analysis, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of temporal anomaly detection, the method comprising:
   accessing sensor data readings obtained at a monitored industrial asset;
   performing a data cleanup operation on at least a portion of the accessed sensor data readings;
   transforming at least the cleaned-up portion of the accessed sensor data readings to time series feature space sensor data;
   applying a multi-kernel-based projection algorithm to the time series feature space sensor data;
   computing a respective anomaly score and a respective ranking for one or more variables of the sensor data readings; and
   providing at least the computed respective anomaly score or the respective ranking for at least one of the one or more variables to a user.

2. The method of claim 1, including the data cleanup operation including filling missing values and removal of outlier data points.

3. The method of claim 1, including transforming the cleaned-up portion by performing temporal feature engineering techniques.

4. The method of claim 1, the multi-kernel-based projection algorithm including:
   accessing a training data set and a testing data set;
   selecting one or more kernel construction options;
   constructing a similarity matrix for the training data set based on each selected kernel option of the one or more kernel construction options;
   calculating a projection matrix element for each constructed similarity matrix element;
   calculating projected embeddings for each calculated projection matrix element by applying the testing data set;
   computing an anomaly score matrix for each calculated projection matrix element; and
   computing the respective anomaly score from corresponding elements of the projection score.

5. The method of claim 1, computing the respective ranking including:
   comparing the respective anomaly score to a predefined threshold;
   for each respective anomaly score having a magnitude greater than the predefined threshold assigning a ranking to each respective anomaly score based on its respective magnitude.

6. A non-transitory computer-readable medium having stored thereon instructions which when executed by a control processor cause the control processor to perform a method of temporal anomaly detection, the method comprising:
   accessing sensor data readings obtained at a monitored industrial asset;
   performing a data cleanup operation on at least a portion of the accessed sensor data readings;
   transforming at least the cleaned-up portion of the accessed sensor data readings to time series feature space sensor data;
   applying a multi-kernel-based projection algorithm to the time series feature space sensor data;
   computing a respective anomaly score and a respective ranking for one or more variables of the sensor data readings; and
   providing at least the computed respective anomaly score or the respective ranking for at least one of the one or more variables to a user.

7. The non-transitory computer-readable medium of claim 6, the instructions further configured to cause the control processor to perform the data cleanup operation by filling missing values and removal of outlier data points.

8. The non-transitory computer-readable medium of claim 6, the instructions further configured to cause the control processor to perform transforming the cleaned-up portion by performing temporal feature engineering techniques.

9. The non-transitory computer-readable medium of claim 6, the instructions further configured to cause the control processor to perform the multi-kernel-based projection algorithm by including:
   accessing a training data set and a testing data set;
   selecting one or more kernel construction options;
   constructing a similarity matrix element for the training data set based on each selected kernel option of the one or more kernel construction options;
   calculating a projection matrix element for each constructed similarity matrix element;
   calculating projected embeddings for each calculated projection matrix element by applying the testing data set;

computing an anomaly score matrix for each calculated projection matrix element; and computing the respective anomaly score from corresponding elements of the projection score.

10. The non-transitory computer-readable medium of claim 6, the instructions further configured to cause the control processor to perform computing the respective ranking including:

comparing the respective anomaly score to a predefined threshold;

for each respective anomaly score having a magnitude greater than the predefined threshold assigning a ranking to each respective anomaly score based on its respective magnitude.

11. A system for temporal anomaly detection, the system comprising:

a control processor in communication with a data store across an electronic communication network, the control processor including a processor unit;

the data store including executable instructions and sensor data records representing monitored conditions of one or more components of an industrial asset;

the executable instructions when executed by the processor unit cause the processor unit to perform a method, the method comprising:

accessing sensor data readings obtained at a monitored industrial asset;

performing a data cleanup operation on at least a portion of the accessed sensor data readings;

transforming at least the cleaned-up portion of the accessed sensor data readings to time series feature space sensor data;

applying a multi-kernel-based projection algorithm to the time series feature space sensor data;

computing a respective anomaly score and a respective ranking for one or more variables of the sensor data readings; and providing at least the computed respective anomaly score or the respective ranking for at least one of the one or more variables to a user.

12. The system of claim 11, the executable instructions further configured to cause the processor unit to perform the data cleanup operation by filling missing values and removal of outlier data points.

13. The system of claim 11, the executable instructions further configured to cause the processor unit to perform transforming the cleaned-up portion by performing temporal feature engineering techniques.

14. The system of claim 11, the executable instructions further configured to cause the processor unit to perform the multi-kernel-based projection algorithm by including:

accessing a training data set and a testing data set;

selecting one or more kernel construction options;

constructing a similarity matrix element for the training data set based on each selected kernel option of the one or more kernel construction options;

calculating a projection matrix element for each constructed similarity matrix element;

calculating projected embeddings for each calculated projection matrix element by applying the testing data set;

computing an anomaly score matrix for each calculated projection matrix element; and computing the respective anomaly score from corresponding elements of the projection score.

15. The system of claim 11, the executable instructions further configured to cause the processor unit to perform computing the respective ranking including:

comparing the respective anomaly score to a predefined threshold;

for each respective anomaly score having a magnitude greater than the predefined threshold assigning a ranking to each respective anomaly score based on its respective magnitude.

* * * * *